12. United States Patent [19]

Webermeier et al.

[11] 4,185,951
[45] Jan. 29, 1980

[54] APPARATUS FOR THE EXTRUSION OF PATTERNED SHEETS OF THERMOPLASTIC SYNTHETIC RESINS

[75] Inventors: Kurt Webermeier, Bonn; Waldemar Wissinger; Otto Rulle, both of Siegburg, all of Fed. Rep. of Germany

[73] Assignee: Dynamit Nobel AG, Fed. Rep. of Germany

[21] Appl. No.: 795,383

[22] Filed: May 10, 1977

[30] Foreign Application Priority Data

May 19, 1976 [DE] Fed. Rep. of Germany ....... 2622289

[51] Int. Cl.² .............................................. B29F 3/12
[52] U.S. Cl. .................................. 425/133.5; 425/207; 425/376 A; 425/376 B; 425/462
[58] Field of Search .................... 264/75, 241, 245; 425/197, 199, 131.1, 133.5, 132, 376 A, 376 B, 462, 200, 207; 366/76, 69

[56] References Cited

U.S. PATENT DOCUMENTS

| 2,803,041 | 8/1957 | Hill et al. | 425/132 X |
| 3,272,901 | 9/1966 | Sims | 264/75 X |
| 3,422,175 | 1/1969 | Rowland | 425/131.1 X |
| 3,718,413 | 2/1973 | Luraschi | 425/131.1 X |
| 3,779,676 | 12/1973 | Bernard | 425/131.1 |
| 4,057,379 | 11/1977 | Sato | 425/199 |

Primary Examiner—Mark Rosenbaum
Attorney, Agent, or Firm—Craig and Antonelli

[57] ABSTRACT

A process for the extrusion of patterned sheets of thermoplastic synthetic resins wherein a transparent basic synthetic resin material is combined with at least one differently colored secondary synthetic resin material, and wherein the combined stream of material made up of the basic material and the secondary material flows, during the extrusion, at least in partial zones at right angles to the extrusion flow direction, based on the flow cross section, is disclosed.

13 Claims, 20 Drawing Figures

APPARATUS FOR THE EXTRUSION OF PATTERNED SHEETS OF THERMOPLASTIC SYNTHETIC RESINS

The present invention relates to a process for the extrusion of patterned sheets of thermoplastic synthetic resins wherein a preferably transparent basic synthetic resin material is combined with one or several differently colored secondary synthetic resin materials. This combination of the basic material with the secondary material or materials can be effected continuously, discontinuously, or at intervals wherein the secondary materials can be embedded into the basic material partially and/or entirely. The apparatus for conducting the process is based on an extrusion die preferably shaped as a fishtail die with a die channel for the extrusion of the material combined from the basic material and the secondary materials.

Processes and devices for the extrusion of patterned sheets of thermoplastic synthetic resins have been disclosed, for example, in DAS (German Published Application) 1,554,863 and in U.S. Pat. No. 3,792,945. The use of the extrusion (continuous molding) method is customary for the manufacture of patterned synthetic resin sheets or panels; in this method, additional, differently colored synthetic resin materials are introduced into a preferably transparent stream of basic material. This combining of basic material and secondary material can already be provided upstream of the extrusion die common to both. For example, it is possible to feed a combined, preliminarily patterned material into the extrusion die. However, it is furthermore known to feed the secondary materials into the basic material within the extrusion die. Various feeding devices are known for this introduction of the secondary materials into the stream of basic material within the extrusion die, wherein a continuous feed or also intermittent feeding procedures are possible. Patterns are produced with the aid of all of these conventional processes and devices wherein the additional colors extend essentially in the flow direction of the extrusion of the panel or sheet. Since, basically, extrusion flow at right angles, i.e. outside of the extrusion flow direction and thus transversely to the thickness of the sheet or panel does not occur, the patterns obtainable are oriented substantially in one direction, namely in the flow direction of the extrusion.

The present invention is based on the object of modifying the conventional processes and devices for the manufacture of patterned sheets of thermoplastic synthetic resins in the extrusion method so that patterns are attainable which have a minimum of unidirectional orientation, i.e. patterns which are maximally irregular and free of orientation. In this connection, the invention starts with conventional processes and devices for the production of patterned sheets of thermoplastic synthetic resins in the extrusion method, by means of which already preliminarily patterned sheets are prepared, as described, for example, in DAS 1,554,863 and U.S. Pat. No. 3,792,945 and/or as disclosed in U.S. Pat. No. 4,128,386, issued Dec. 5, 1978.

The object is attained, in accordance with the invention, by providing that the combined stream of material made up of the basic material and the secondary material flows during extrusion at least in partial zones at right angles to the extrusion flow direction, based on the flow cross section. In this connection, the provision is made that chronologically and locally limited partial streams having a flow direction deviating from the extrusion flow direction are produced in the combined stream of material. This can be accomplished, for example, by agitating the stream of material or by producing therein a reciprocating motion, for example, so that differing transverse currents are created by interfering with the current in the extrusion flow direction. With the aid of this process step in accordance with the invention, it is made possible to disturb the only unidirectionally oriented stream of material and thus the longitudinally oriented patterning of the embedded secondary materials and to obtain a spreading of the patterns by distribution and also partial intermixing in directions at right angles to the extrusion flow direction.

One field of application of the invention is, for example, the manufacture of patterned, extruded thermoplastic synthetic resins for the production of spectacle frames of, for instance, cellulose acetate or cellulose acetate butyrate.

The process of this invention is utilized, in particular, for sheets of material, i.e. streams of material, which have already been provided with preliminary patterning, wherein this preliminary patterning of the material means that, as seen over the cross section, differing streams of colored material are present at arbitrary locations. Such preliminary patterns can be, for example, "Havanna"-like patterns, striped patters in the flow direction with or without intermittent interruptions, but they can also be differently colored layers over the thickness or width in side-by-side and superimposed relationships, and also combinations of such patterns. However, the invention can also be utilized for thermoplastic sheets wherein, for example, a transparent basic material is dyed with metallic pigments, nacreous pigments, or the like as the coloring material which, with normal extrusion, would yield, aligned only in one direction, a uniform pattern. With the use of the present invention, however, streak-like patterns are also created in this case.

An apparatus for conducting the process of this invention is based on an extrusion die, preferably fashioned as a fishtail die, with a die channel for the extrusion of the material combined from basic and secondary materials and thus having been preliminarily patterned. The combining of the basic material with the secondary material or materials can take place either upstream of the die or within the die. In the latter case, a conventional device is employed comprising an extruder with a fishtail extrusion die for the basic material and one or several extruders for one or several secondary materials, wherein feeding means for introducing the secondary materials into the basic material within the extrusion die are provided.

The extrusion die is fashioned in accordance with the invention so that at least one movable element is provided which extends into the flow cross section of the die channel of the extrusion die. With the aid of arbitrarily formed elements arranged at right angles or obliquely to the stream of material in the flow cross section of the extrusion die, transverse currents can be created in partial zones of the stream of material, at right angles to the thickness as well as right angles to the width of the sheet to be extruded by moving these elements. Correspondingly, an additional distribution of the colored secondary materials in the basic material takes place, whereby an enlarged pattern is obtained in accordance with the type of movement. In this connection, it is possible to use one or several, identical or differently shaped elements, thus effecting corresponding transverse currents in corresponding partial zones of the stream of material and achieving a change in the distribution of the material in partial zones of the stream of material over the cross section occupied by such partial zones.

In order to execute the process step of this invention of arbitrarily generating transverse currents in the combined stream of material and to achieve the thus-attainable additional patterning by means of one or several elements, the axes of these elements can lie in the direction of the width of the sheet to be extruded, as well as in the direction of the thickness thereof and possibly also in the direction of the extrusion axis. Also, intermediate angles of the axial arrangement of the elements with respect to these three aforementioned primary axes of the extruded sheet are possible.

In accordance with one embodiment of the invention the element is fashioned to be rod-like and is arranged with its longitudinal axis preferably within the flow cross section. Another suggestion provided by the invention is to fashion the element in a plate-like or disk-like configuration and to locate the axis of the element preferably outside of the flow cross-section. Such elements are preferably disposed at right angles to the extrusion flow direction and/or almost at right angles to the extrusion flow direction, extending into the stream of material from one side; in this connection, for mechanical reasons, the axis is preferably provided outside of the cross section and is driven to produce a movement, for example a rotary motion.

To generate a movement, the element is connected to a drive mechanism. A rotary motion is preferably provided as the movement, but oscillating motions or motions caused by eccentrics are also suitable, for example.

To attain maximally voluminous and varying transverse currents in the stream of material, the invention furthermore proposes to fashion the elements with perforations to allow the stream of material to pass therethrough. In this connection, it is desirable to construct a maximally large part of the surface of the element as the throughflow orifice. The transverse currents or a turbulence in the stream of material as seen across the flow cross section are attained by means of the perforations of the element in that the stream of material flows into the perforations and, after exiting therefrom, re-enters the flow of material at a place different from its entrance point into the element, due to the fact that the element is simultaneously in motion, e.g. rotation, during this process.

Besides the feature of having the stream of material flow positively through the predetermined perforations of the element with, for example, simultaneous rotation of the latter, it is also possible to fashion the surface of the element in the manner of a comb, or with nubs or with a similar profile so that the stream of material can flow around the element in this profiling. Due to the incorporated element, the flow cross section is also narrowed, whereby the stream of material is forced into the profiling as the available throughflow cross section; at the same time, the element is set into motion so that there is not only a linear deflection of streams of material, but also an offsetting of the stream of material across the cross section.

The velocity of the motion is dependent on the characteristics of the material, as well as the ....ned patterns and/or changes to be made in the preliminary pattern.

When fashioning the elements in the manner of rods with perforations, the perforations can be formed as bores having a round, oval, or other cross section, and also as slots and so forth. These perforations can be inclined at arbitrary angles with respect to the longitudinal axis of the element; the perforations can also meet one another or intersect with one another. When fashioning the element on the surface so that the stream of material can flow around the element, the surface can also be fashioned as desired with nubs, vanes, ribs, or the like, which can be arranged with respect to one another at angles which can be chosen arbitrarily in their mutual relationship. It is also possible to fashion the element with perforations and profiling on the surface.

It is furthermore feasible to construct the element to be hollow and to provide the walls with perforations, for example in a tubular manner.

The axes of the agitating elements can be arranged in any desired direction with regard to the extrusion flow direction of the material, preferred directions being transversely, perpendicularly, and longitudinally to the extrusion flow direction. In this connection, it is possible to dispose the elements at right angles to the extrusion flow direction in any desired arrangement with respect to the flow cross section, for example centrally, unilaterally, mutually opposed or offset with respect to one another and/or in a series arrangement, wherein one or more identical or differently shaped elements can be provided. Depending on the given preliminary patterning of the combined stream of material, a corresponding pattern can be achieved by means of the number and arrangement of the elements, as well as by the selectable movement, the moving velocity, the selectable direction of rotation, as well as a variable speed of the elements. It is also possible to provide an eccentric drive mechanism producing a reciprocating pivotal motion.

The invention will be described in greater detail below with reference to the drawings wherein:

FIG. 4 shows a finished pattern produced by the device of FIG. 3 with the aid of the preliminary pattern of FIG. 2a;

Figure 1:
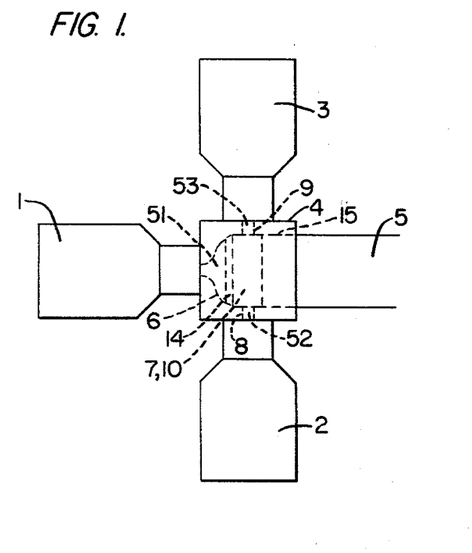
FIG. 1 shows a schematic top view of an extrusion device for patterned sheets.

In FIG. 1, an extrusion device is illustrated schematically, by means of which a multicolored synthetic resin sheet oriented in the extrusion flow direction is extruded. The extruder 1 extrudes the basic polymeric material 51, which is preferably transparent, via the attached fishtail die 4 to form the sheet 5. In this connection, the fishtail die 4 comprises the distributor slot 6 for the basic material 51, this slot passing over via the manifold 14 into the die channel 7 followed by the die orifice slot 15.

The feeding of the additional synthetic resin additives having a different color is effected by way of further extruders 2, 3 directly into the fishtail die 4. From the extruders 2, 3, secondary polymeric materials 52, 53 dyed differently from each other in each particular case, are introduced via feeding means 10 directly into the die channel 7 and combined therein with the basic material 51. By way of the die orifice slot 15, a preliminarily patterned sheet 5, wherein the pattern is oriented in the extrusion flow direction, exits from the die. Examples of such preliminarily patterned sheets oriented in the extrusion direction are schematically illustrated in FIGS. 2a to 2c.

Figure 2A:
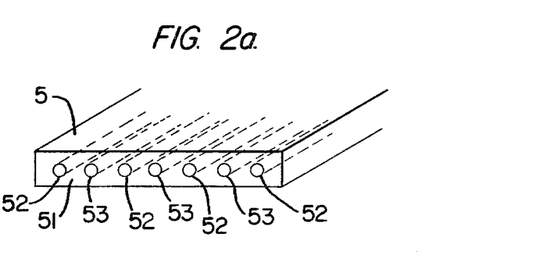
FIGS. 2a–2c show preliminarily patterned sheets produced by the device of FIG. 1.
Figure 2B:
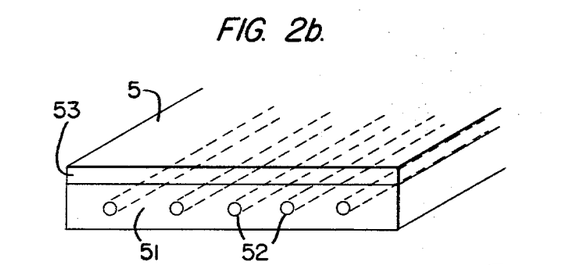
Figure 2C:
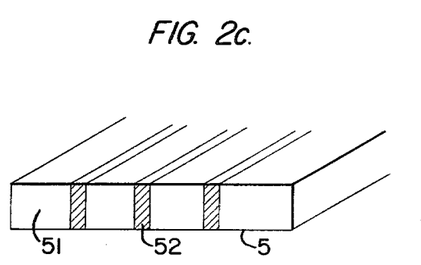

In this connection, FIG. 2a shows a preliminarily patterned sheet 5 wherein colored strips 52, 53 having colors different from each other are embedded in the transparent basic material 51. FIG. 2b shows a modification of this pattern wherein unilaterally a layer of colored material 53 is additionally provided on top of the transparent basic material, while additional colored strips 52 are present within the transparent basic material. Patterns vertically to the thickness of the extruded sheet 5 are likewise possible, as shown in FIG. 2c, for example. Moreover, it is possible to interrupt the colored materials in the longitudinal direction by a corresponding, intermittent control and/or interruption of the feeding means 10. The illustrated embodiments of the preliminary patterns as shown in FIGS. 2a–2c merely represent examples; further possibilities exist, depending on the construction of the feeding means 10 and the number of additional extruders employed. It is furthermore feasible to feed an already combined material of a basic material and one or several secondary materials into the fishtail die, this combining step having been executed previously. An apparatus suitable for this purpose is disclosed in U.S. Pat. No. 3,792,945.

Figure 3:
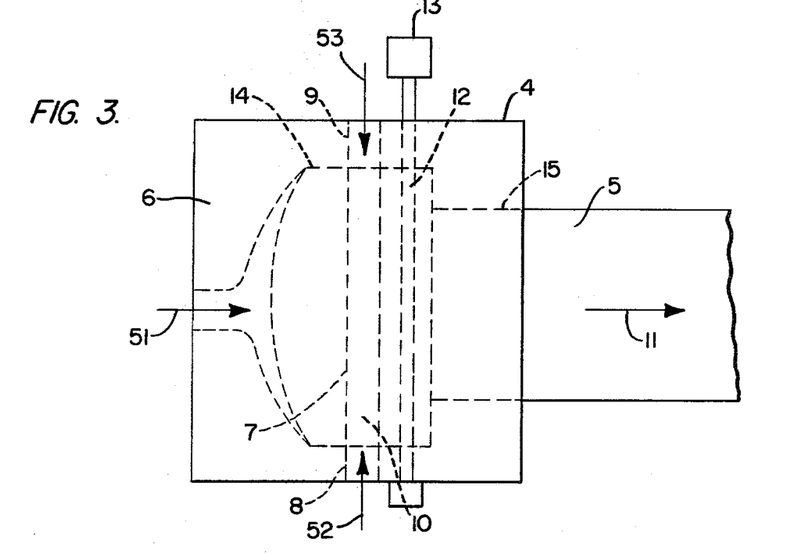
FIG. 3 shows a schematic top view of a fishtail die with an additional element according to the invention.

FIG. 3 shows schematically in a top view the fishtail die 4 of FIG. 1 fashioned in accordance with the invention.

Figure 7:
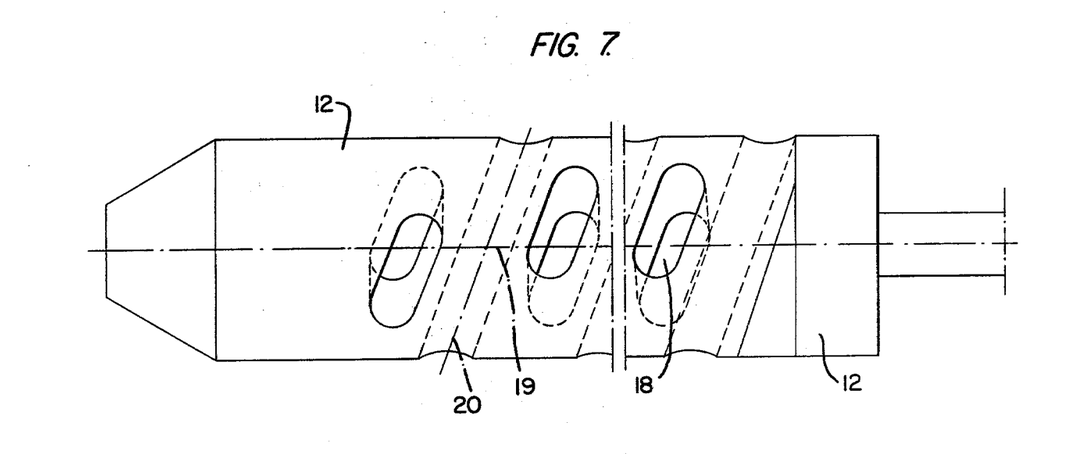
FIG. 7 shows a view of an element.

No matter how the feeding means 10 for introducing the additional colored materials 52, 53 may be constructed, due to the given extrusion flow direction 11 the patterned sheet 5 will always have a pattern oriented in the extrusion flow direction. To reduce this orientation in the extrusion direction and/or if possible to eliminate such orientation and to provide a further variation of the pattern over the entire cross section of the extruded sheet, the combined stream of material from individual streams 51, 52, 53 is subjected, after having been combined, to an additional movement outside of the extrusion flow direction 11. This generation of cross currents is accomplished by means of the schematically illustrated element 12 extending into the flow cross section still in the zone of the die channel 7 upstream of the die orifice slot 15. The element 12, which is shown in greater detail e.g. in FIG. 7, is rotated by means of a drive mechanism 13, wherein the direction of rotation is variable and the speed of rotation can likewise be changed. It is also possible to choose to arrange the element in the flow cross section, wherein one or several elements can be provided in side-by-side, superimposed, or displaced relationship with respect to one another, extending entirely or merely partially across the flow cross section.

Figure 4:
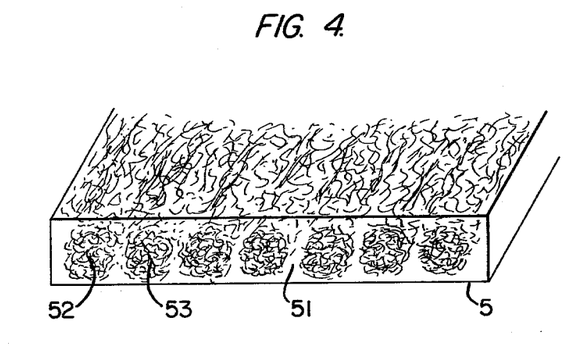

FIG. 4 shows schematically how, due to the influence of the element exerted on the combined stream of material, the originally thread-like or strip-shaped colored materials in the basic material have been spread out in the manner of streaks or ocellated as a peacock feather, the longitudinal extension of this pattern likewise being outside of the original, linear axis. In this way, a more broadly distributed pattern is created in the sheet 5 approaching more closely an irregular pattern image.

Figure 5:
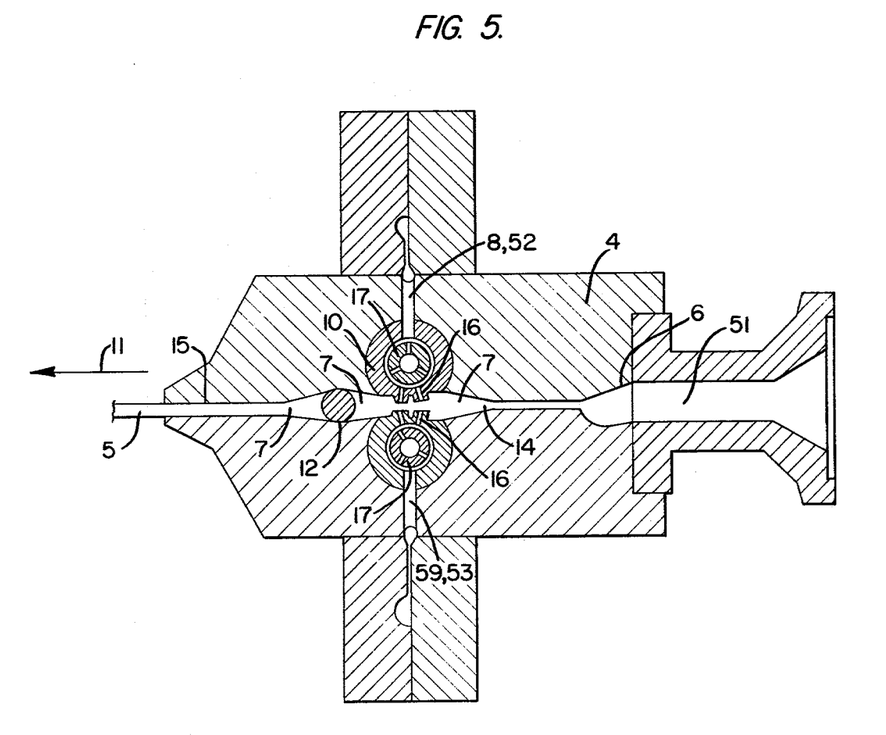
FIG. 5 shows a longitudinal cross section through a fishtail die with two additional coloring materials and with an element.

FIG. 5 shows a fishtail die for the extrusion of patterned synthetic resin sheets in a simplified form in longitudinal section. The illustrated fishtail die 4 is designed so that, in addition to the basic material stream, two mutually different streams of colored material are fed into the die. The stream of basic material 51 coming from the extruder 1, shown in FIG. 1 but not shown in FIG. 5 is distributed in a correspondingly constructed distributor slot 6 uniformly over the entire width of the die. The manifold 14 with the die channel 7 follows the distributor slot 6, and thereafter follows the die orifice slot 15, at the end of which the finished sheet 5 is discharged. The feeding means 10 for the differently colored secondary materials 52, 53 terminate in the die channel 7 to embed the secondary materials into the basic material 51. The secondary materials 52, 53 are introduced, after being discharged from the extruders, via the feed ducts 8, 9 by way of tubular outlet openings 16 into the stream of basic material 51. In the illustrated example, screw-shaped rotary slides 17 are furthermore arranged between the feed ducts 8, 9 and the outlet ducts 16; these rotary slides effect interruptions in the feed of the secondary materials due to their rotary motion. Such a device is disclosed, for instance, in U.S. Pat. No. 4,128,386, issued Dec. 5, 1978.

However, other feeding devices for the secondary materials are possible in connection with the illustrated die 4; in this connection, attention is invited to the known devices disclosed in DAS 1,554,863 and U.S. Pat. No. 3,792,945. The multicolored stream of material, presently combined, continues its flow through the forward portion of the die channel into the die orifice slot 15. In this forward portion of the die channel, the rod-like element 12, which is rotatable for example, is disposed, which in the illustrated embodiment fills the flow channel most extensively along its inside diameter. The rotatable element 12 proper can have any desired configuration, thus producing novel color structures (patterns) depending on the cross section of the element, its direction of rotation, its speed of rotation, or some other movement, and on the given (preliminary) patterning; these novel color structures also exhibit a texture at right angles to the thickness and at right angles to the width of the sheet.

In FIG. 7, a view of an element 12 is shown as it can be utilized, for example, in the arrangement of FIG. 5. The element 12 is fashioned in this connection as a rod extending over the entire width of the flow cross section into the die channel and being driven unilaterally. Since the diameter of the element corresponds practically to the thickness of the die channel cross section, the element 12 is fashioned with the perforations 18. These perforations or bores 18, having an oval cross section in the illustrated example, are arranged in the drawing at an angle with respect to the longitudinal axis 19 of the element 12, in this case about 70°, and in this connection the bores are furthermore disposed alternatingly displaced with respect to one another by 90°. The bores or perforations 18, which can also have the form of slots or circular holes, constitute the throughflow cross section for the combined stream of material. This throughflow cross section should be, as based on the surface of the element 12, at least 20% of this element. Since the element furthermore rotates about its longitudinal axis, the stream of material forced into the bores is additionally removed by the amount of the rotation from its original location in the stream of material in the flow direction, and is discharged at a new location, whereby the structuring is produced which extends at right angles to the width of the sheet and at right angles to the thickness of the sheet. Depending on the desired redistribution of the combined stream of material, it is also possible to choose arbitrarily other angular positions of the individual bores within the element, as well as of the element proper with regard to the extrusion flow direction. In the example of FIG. 7, the axis 20 of the oval bores 18 is arranged to be inclined with respect to the axis 19 of the element. A vertical position of the bores 18 is likewise possible, but in this case a different pattern is created. Also, a portion of the outer periphery is provided with cut-outs or depressions 20 for altering the flow of material.

Figure 6:
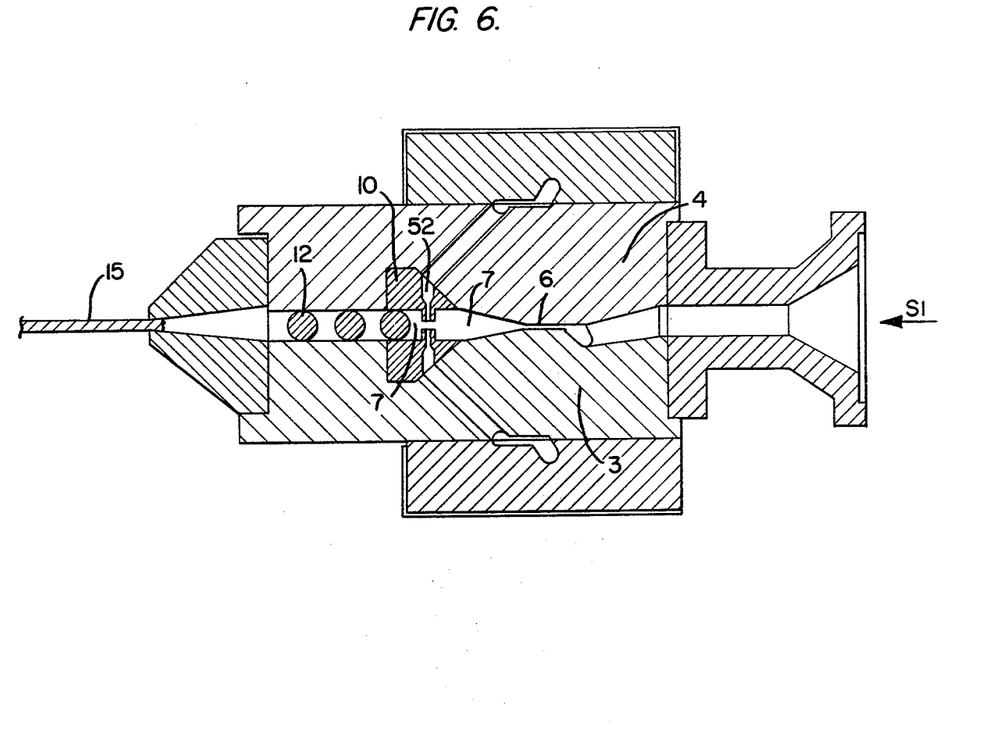
FIG. 6 shows a longitudinal cross section through a fishtail die with the element in a different arrangement.

FIG. 6 shows a further embodiment for the arrangement of elements according to the invention in a fishtail die 4. Here again, the fishtail die 4 is fed with the basic stream of material 51, and within the die channel 7, the secondary materials 52, 53 are introduced via the feeding devices 10 by way of tubular outlet openings 16. In this embodiment, the streams of secondary material are not interrupted as in the embodiment of FIG. 5, but rather in this case continuously flowing threads of color are produced within the stream of basic material, disposed in the central region of the stream of material, rather than on the surface. The multicolored stream of material produced in the die channel then meets with three elements 12 arranged one behind the other and being rotatable. By the series disposition of several elements, with each element having a corresponding configuration, each element can execute a different function for the distribution and agitation and deflection of the multicolored stream of material and thus for the production of a correspondingly rich pattern. Depending on the shape of the elements, their number, direction of rotation, speed of rotation, and preliminary patterning of the material, patterns can be attained which have structures different from one another. On account of the elements employed, additional flow textures at right angles to the thickness and at right angles to the width of the flow cross section are created in the directionally flowing stream.

Figure 8A:
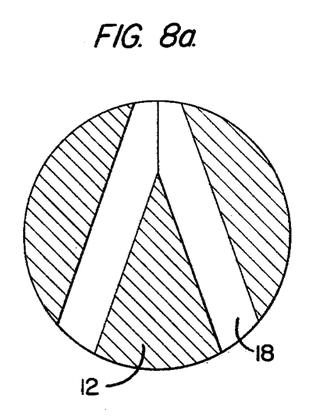
FIGS. 8a–8c show additional cross sections of modifications of the element according to FIG. 7.
Figure 8B:
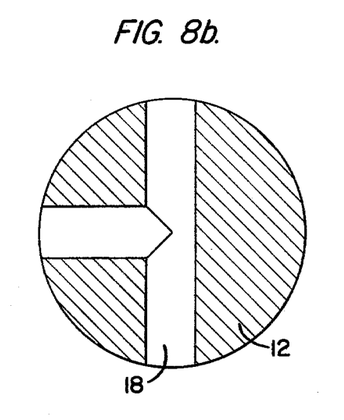
Figure 8C:
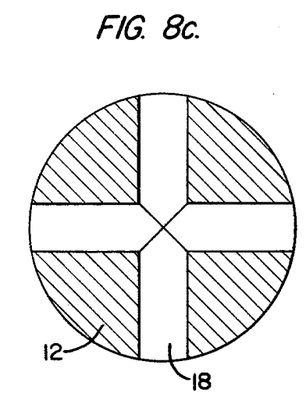

FIGS. 8a to 8c are schematic views of additional cross sections of a rod-shaped and preferably rotatable element according to FIG. 7, illustrating additional possibilities of arranging the perforations and/or bores 18 extending through the element 12. In the example of FIG. 8a, two bores 18 meet each other; in the example of FIG. 8c, two bores 18 intersect; while in the example of FIG. 8b there is provided merely a T-shaped unilateral intersection of bores 18. The cross section of the perforations 18, their inclination with respect to the longitudinal axis 19 of the element 12 and to the cross section of the element, as well as the number of bores can be varied as desired and depend on the intended patterns and on the preliminary pattern imparted to the extruded sheet.

Figure 9:
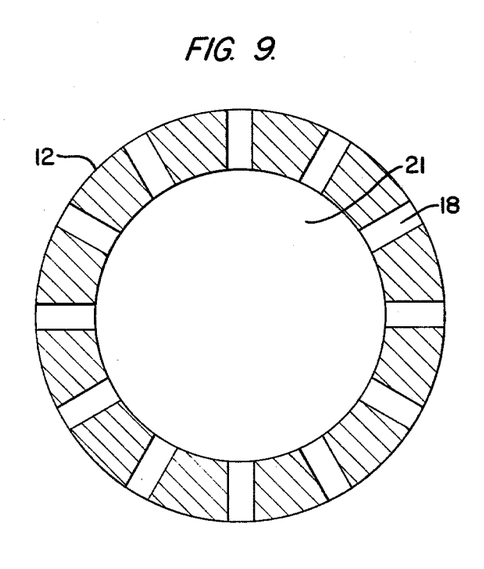
FIG. 9 shows a further cross section of an element.

FIG. 9 likewise shows, as has been preferred in the preceding embodiments, a rod-shaped and rotatable element which is traversed by the combined stream of colored material. However, the rod-shaped element 12 does not have a solid cross section, but rather is fashioned as a tubular body having the cavity 21. Starting from the surface of the element, perforations 18 as holes or slots are provided; these perforations can have any desired configuration and can be arranged arbitrarily and connect the outside with the cavity 21 through the wall of element 12. A stream of material passing into the cavity 21 by way of the perforations 18 is further transported by the movement of the agitating element as seen over the cross section of the stream of material and exits through the perforations 18 at a different location from the element 12 and into the stream of material which continues to flow in the extrusion flow direction. Thereby, the desired patterns are obtained which break up the unilaterally longitudinally oriented pattern caused by the predetermined extrusion direction.

Figure 10:
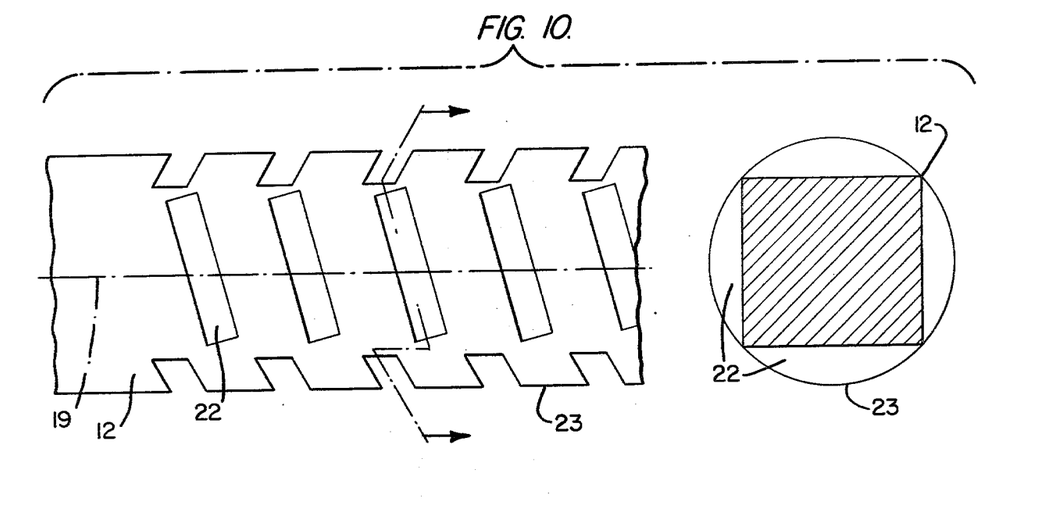
FIG. 10 shows two views of an externally profiled element.

To realize the invention, it is also possible to employ, in addition to elements which are traversed by the combined stream of material, elements wherein the stream of material flows at least partially around the outside of the elements; in this connection, FIG. 10 illustrates an example in the form of a rod-shaped element in a schematic, fragmentary view in a plan view and cross-sectional illustration. The entire surface of the element 12 is provided with slot-shaped cutouts 22, between which so-called ridges or nubs 23 remain standing. The cutouts 22 or ridges 23 are disposed obliquely with respect to the longitudinal axis 19 of the element and alternate with one another in the angle to this longitudinal axis. The width, height, angle, and spacing, as well as the mutual displacement of these cutouts 22 and ridges 23 with respect to one another, as well as their number in rows along the circumference can be varied as desired in dependence on the required pattern. By the profiling of the surface of element 12, there occurs not only a forced deflection of the combined stream of material, but simultaneously, due to the rotary motion of the element, also a further transport outside of the extrusion flow direction.

In this connection, it is important that the stream of material be interrupted, i.e. altered. In addition, to the illustrated rod-shaped constructions, still other configurations of rod-like elements are possible, e.g. in the form of helically shaped rotary elements or as rotary elements simulating a crankshaft.

Figure 11:
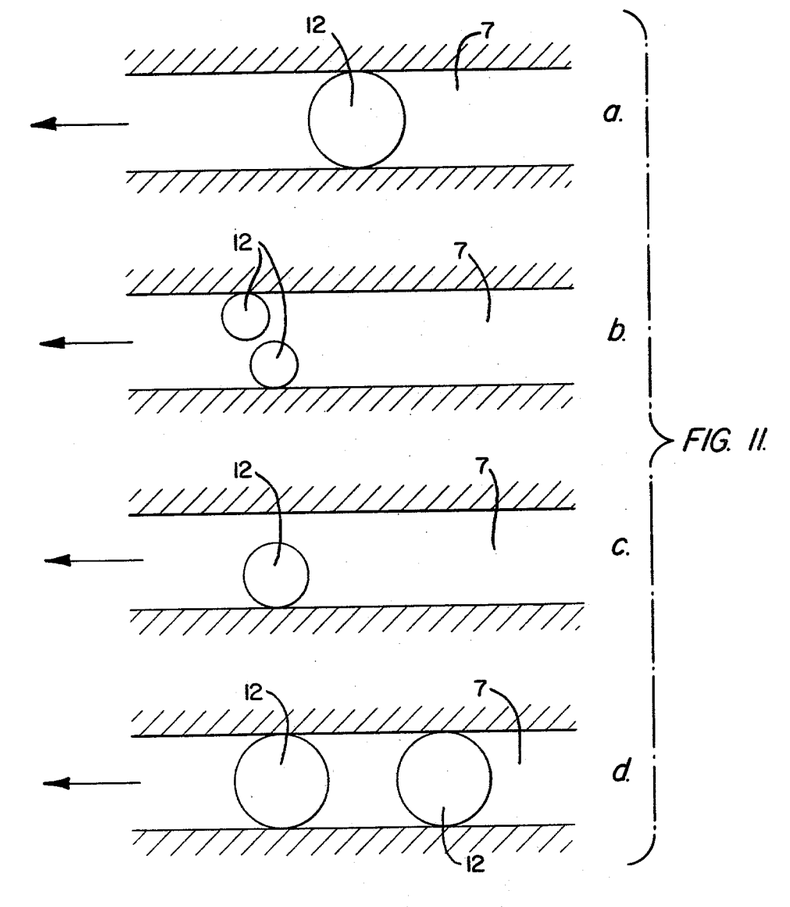
FIGS. 11a–11d are schematic illustrations of arrangements of the element within the fishtail die.

FIG. 11 shows a selection of various possibilities for the arrangement of elements, particularly rod-like elements, in the die channel 7. As seen in the extrusion flow direction 11, the element 12 according to FIG. 11a fills the cross section almost entirely, merely one element being provided. In accordance with the embodiment of FIG. 11d, two elements 11 are arranged in series at a mutual spacing. However, it is likewise possible to arrange still a third or even fourth element.

In the embodiment according to FIG. 11b, elements 12 are employed, the cross section of which is smaller than the flow cross section, wherein for example two mutually offset elements are provided which can also be of different configurations. This is of interest, for instance, if the preliminary pattern of the stream of material, as seen over the cross section, is different. In the embodiment of FIG. 11c, an element is shown which extends into the die channel 7 only along one side.

As can be seen from the illustrated examples, the elements can be arranged centrally as well as eccentrically within the die channel; they can be arranged in side-by-side as well as superimposed relationship, as well as displaced with respect to each other. Also, the direction of rotation of the elements can be in the same direction or in the opposite direction, or alternatingly with identical or different speeds of rotation, or speeds of rotation which possibly are also variable over a period of time. All of these possibilities of variation can create a multitude of variegated patterns if selected appropriately with respect to one another and in correspondence with the type of preliminary pattern.

In addition to the previously illustrated rod-like elements, it is also possible to use elements along the lines of this invention which are movable and have any other desired shapes.

Figure 12:
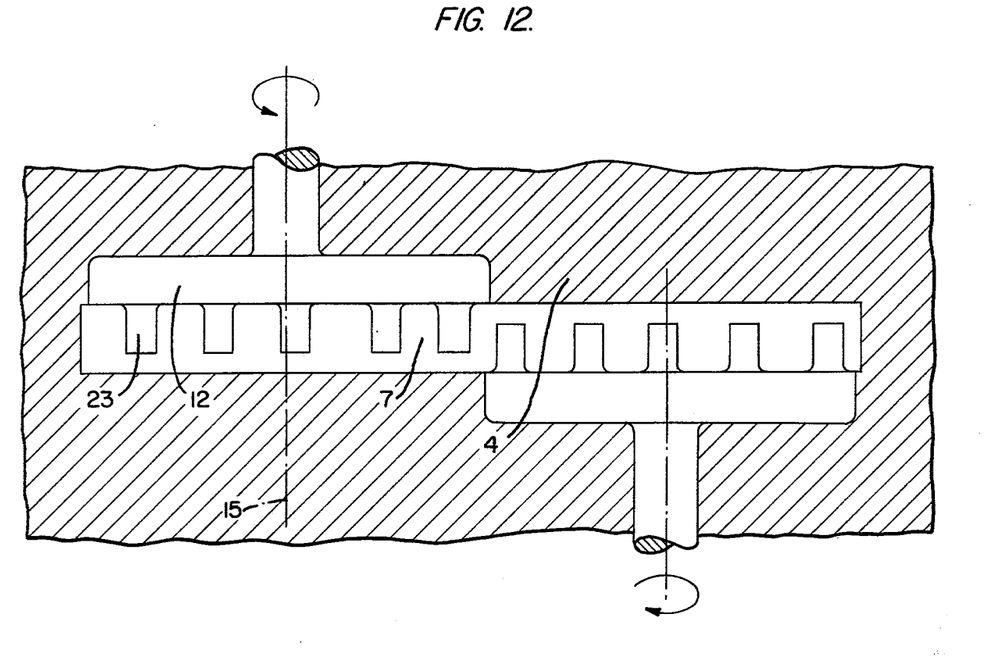
FIGS. 12 and 13 are schematic views of elements disposed at right angles to the extrusion direction.

FIG. 12 shows such an example schematically in the cross section of the die channel 7 of the die 4, wherein disk-shaped elements 12 are provided for the production of cross currents in the combined stream of material. The representation is purely schematical and shows only the basic arrangement. The axes 19 of the elements 12 are here arranged in the direction of the thickness of the extruded sheet, i.e. the thickness of the manifold 14a. The elements 12, two of which are provided in side-by-side relationship but displaced mutually by 180°, are in part within and in part outside of the die channel 7. The elements carry arbitrarily shaped nubs or ridges 23 along their sides extending into the die channel 7. In this connection, it is advantageous to have only the nubs 23 extend into the die channel 7. The nubs 23 can be arranged at any desired points of the elements 12, depending on the intended cross current and the thus-attainable pattern effect. These nubs can also be fashioned with varying sizes. Also, the arrangement of the elements 12 with respect to the location occupied by them with regard to the stream of material in the die channel 7 can be chosen arbitrarily, and this holds true regarding the number of elements, their unilateral or bilateral and/or mutually opposed disposition, as well as regarding the mutually displaced position within the die channel, depending upon the requirements. The elements 12 on FIG. 12 are preferably rotated; see the arrow.

Figure 13:
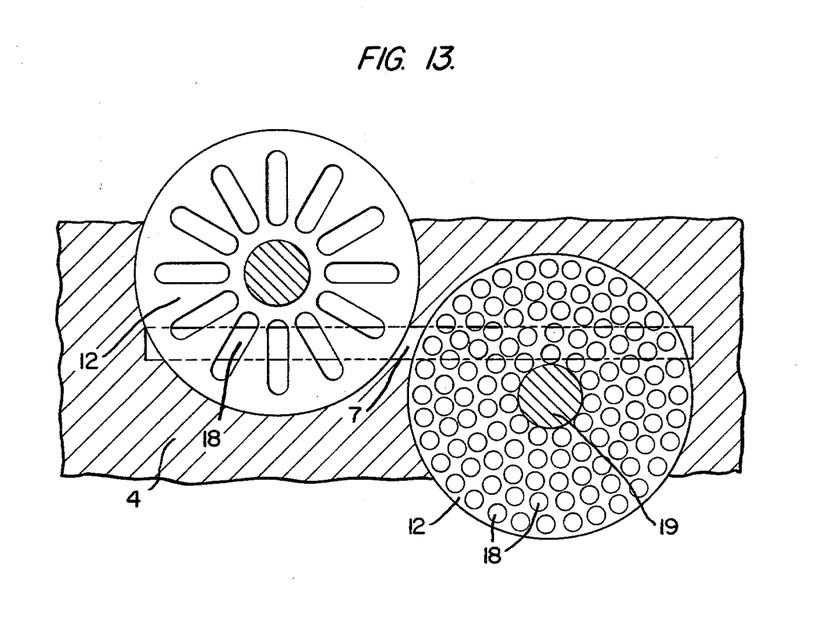

A further possibility for fashioning and arranging the elements according to their invention is illustrated schematicaly in FIG. 13. The die channel 7 is formed in the cross section of the fishtail die 4, the disk-shaped elements 12 extending into this channel. In this embodiment, the axes 19 of the elements are in the extrusion flow direction of the stream of material, wherein here again the angles of the axes 19 are variable at will. The axes 19 of the elements lie preferably outside of the die channel 7. The configuration of the elements proper can be arbitrary and is adapted to the cross currents to be produced. In the illustrated example of FIG. 13, the element 12 is fashioned as a plate with perforations 18. The perforations 18 can be of any desired shape and size and mutual association; two modifications are shown in the embodiment of FIG. 13. In addition thereto, it is also possible to utilize surfaces of the elements in the shape of wings, wheels, vanes, or of any other desired shape, depending on the desired texturing of the pattern, for example in an arrangement according to FIG. 13.

The elements 12 illustrated in FIG. 13 are arranged with their axes 19 outside of the manifold 14a, and this is advantageous for constructional reasons, as well as for considerations of flow dynamics.

What is claimed is:

1. An apparatus for the extrusion of patterned sheets of thermoplastic synthetic resins of a transparent basic synthetic resin material combined with at least one differently colored secondary synthetic resin material, which comprises:
   (a) an extrusion die having a die channel for the extrusion of said thermoplastic synthetic resins, wherein said thermoplastic synthetic resins of a transparent basic synthetic resin material combined with at least one differently colored secondary synthetic resin material are adapted to flow through said die channel in a stream in an extrusion flow direction,
   (b) feeding means for feeding said transparent basic resin material and said at least one differently colored secondary synthetic resin material to said die channel, whereby said transparent basic resin material combined with said at least one differently colored secondary synthetic resin material passes through said die channel in a stream, and
   (c) means for causing partial streams of said stream of said thermoplastic synthetic resins of a transparent basic synthetic resin material combined with at least one differently colored secondary synthetic resin material to flow at an angle to the extrusion flow direction in said die channel without mixing the entirety of said stream, said means comprising at least one movable element extending into the flow cross section through which said stream passes in said die channel of the extrusion die, said at least one movable element being formed with perforations for allowing the materials to pass therethrough, whereby sheets having patterns which are irregular and free of orientation are formed.

2. An apparatus according to claim 1, wherein the at least one element is fashioned to be rod-shaped and is arranged with its longitudinal axis within the flow cross section of said channel.

3. An apparatus according to claim 1, wherein at least two elements are provided at an angle to the extrusion direction in an arrangement within the flow cross section.

4. An apparatus according to claim 3, wherein said at least two elements are differently shaped.

5. An apparatus according to claim 3, wherein said at least two elements are identically shaped.

6. An apparatus according to claim 1, wherein the peripheral surface of the at least one element is profiled to have an irregular configuration which will cause a change in the direction of flow of at least a portion of the stream of synthetic resins.

7. An apparatus according to claim 1, wherein the at least one element is hollow and has walls that are fashioned with perforations.

8. An apparatus according to claim 1, wherein the at least one element is connected to a drive mechanism which causes movement thereof.

9. An apparatus according to claim 1, wherein the at least one element is rotatable.

10. An apparatus according to claim 1, wherein the at least one element is rod-shaped, and the perforations are arranged at an angle to the longitudinal axis of said at least one element.

11. An apparatus according to claim 1, wherein the at least one element is rod-shaped, and said perforations constitute two bores which meet each other.

12. An apparatus according to claim 1, wherein the at least one element is rod-shaped, and said perforations constitute two bores which intersect.

13. An apparatus according to claim 1, wherein the at least one element is rod-shaped, and said perforations constitute two bores which form an T-shaped intersection.

* * * * *